(12) United States Patent
Schmidt et al.

(10) Patent No.: US 10,104,127 B2
(45) Date of Patent: *Oct. 16, 2018

(54) MANAGING COMPUTING RESOURCE USAGE FOR STANDARDS COMPLIANCE

(71) Applicant: Amazon Technologies, Inc., Reno, NV (US)

(72) Inventors: Stephen E. Schmidt, Herndon, VA (US); Eric Jason Brandwine, Haymarket, VA (US); Luis Felipe Cabrera, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/479,168

(22) Filed: Apr. 4, 2017

(65) Prior Publication Data
US 2017/0208099 A1    Jul. 20, 2017

Related U.S. Application Data

(63) Continuation of application No. 12/585,999, filed on Sep. 30, 2009, now Pat. No. 9,621,584.

(51) Int. Cl.
*H04L 29/06* (2006.01)
*H04L 12/24* (2006.01)
(Continued)

(52) U.S. Cl.
CPC ............ *H04L 63/20* (2013.01); *H04L 9/3247* (2013.01); *H04L 41/0803* (2013.01); *H04L 63/0263* (2013.01); *G06F 21/53* (2013.01)

(58) Field of Classification Search
None
See application file for complete search history.

(56) References Cited

U.S. PATENT DOCUMENTS 6,587,945 B1   7/2003   Pasieka
6,658,403 B1   12/2003  Kuroda et al.
(Continued)

OTHER PUBLICATIONS

"Splunk Search, Alert, Report and Share IT Data in Real Time," http://www.splunk.com/view/SP-CAAACPU, retrieved Sep. 29, 2009 (6 pages).

(Continued)

*Primary Examiner* — Malcolm Cribbs
(74) *Attorney, Agent, or Firm* — Seed IP Law Group LLP

(57) ABSTRACT

Systems and methods are provided for configuring and monitoring computing resources of an entity for compliance with one or more standards. In one implementation, a server receives one or more identifiers of one or more standards and determines a plurality of configuration settings for the computing resources of the entity, based on the received one or more identifiers. The plurality of configuration settings comply with the one or more standards. The computing resources of the entity are configured according to the plurality of configuration settings. The server detects an event related to the computing resources. The detected event and the plurality of configuration settings are evaluated for compliance with the one or more standards. A determination is made whether the entity is compliant with the one or more standards, based on the evaluation, and an action is taken, based on the determination.

18 Claims, 4 Drawing Sheets

(51) Int. Cl.
*H04L 9/32* (2006.01)
*G06F 21/53* (2013.01)

(56) References Cited

U.S. PATENT DOCUMENTS

| | | | |
|---|---|---|---|
| 6,735,701 | B1 | 5/2004 | Jacobson |
| 7,376,719 | B1 | 5/2008 | Shafer et al. |
| 8,261,268 | B1 | 9/2012 | Forgette |
| 9,621,584 | B1 * | 4/2017 | Schmidt ............... G06F 21/577 |
| 9,697,019 | B1 * | 7/2017 | Fitzgerald ............. G06F 9/455 |
| 2001/0027519 | A1 | 10/2001 | Gudbjartsson et al. |
| 2003/0014222 | A1 | 1/2003 | Klass et al. |
| 2003/0065942 | A1 | 4/2003 | Lineman et al. |
| 2004/0039580 | A1 | 2/2004 | Steger |
| 2005/0086511 | A1 | 4/2005 | Balacheff et al. |
| 2005/0235123 | A1 * | 10/2005 | Zimmer ............... G06F 9/5016 711/170 |
| 2006/0143617 | A1 | 6/2006 | Knauerhase et al. |
| 2006/0156381 | A1 | 7/2006 | Motoyama |
| 2006/0236127 | A1 | 10/2006 | Kurien et al. |
| 2007/0162973 | A1 | 7/2007 | Schneier et al. |
| 2007/0180436 | A1 * | 8/2007 | Travostino ........... G06F 9/4856 717/138 |
| 2007/0234337 | A1 | 10/2007 | Suzuki et al. |
| 2007/0250833 | A1 | 10/2007 | Araujo, Jr. et al. |
| 2007/0260723 | A1 | 11/2007 | Cohen et al. |
| 2007/0294537 | A1 | 12/2007 | Peyravian et al. |
| 2008/0134175 | A1 * | 6/2008 | Fitzgerald ........... G06F 9/45533 718/1 |
| 2008/0134176 | A1 * | 6/2008 | Fitzgerald ........... G06F 9/45537 718/1 |
| 2008/0134177 | A1 | 6/2008 | Fitzgerald et al. |
| 2008/0134178 | A1 * | 6/2008 | Fitzgerald ........... G06F 9/45537 718/1 |
| 2008/0184225 | A1 * | 7/2008 | Fitzgerald ............. G06F 9/455 718/1 |
| 2008/0201708 | A1 * | 8/2008 | Carter .................. G06F 21/121 718/1 |
| 2008/0209016 | A1 | 8/2008 | Karve et al. |
| 2008/0216147 | A1 | 9/2008 | Duffy |
| 2008/0262863 | A1 | 10/2008 | Stickley et al. |
| 2009/0012834 | A1 | 1/2009 | Fahey |
| 2009/0183168 | A1 | 7/2009 | Uchida |
| 2009/0328225 | A1 | 12/2009 | Chambers et al. |
| 2010/0058432 | A1 | 3/2010 | Neystadt et al. |
| 2010/0070319 | A1 | 3/2010 | Prafullchandra et al. |
| 2010/0071025 | A1 * | 3/2010 | Devine ............... G06F 9/45558 726/1 |
| 2010/0083251 | A1 * | 4/2010 | McCrory ............... G06F 9/455 718/1 |
| 2010/0205303 | A1 * | 8/2010 | Chaturvedi ............ G06F 21/10 709/226 |
| 2010/0318454 | A1 | 12/2010 | Warncke et al. |
| 2010/0325628 | A1 | 12/2010 | Haga et al. |
| 2011/0055034 | A1 | 3/2011 | Ferris et al. |

OTHER PUBLICATIONS

"Security Information Management," http://www.ca.com/us/security-information-management.aspx, retrieved Sep. 29, 2009 (2 pages).
CA Enterprise Log Manager Solution Implementation, "Implement an Effective Enterprise Log Management Solution," 2009 (2 pages).
CA Enterprise Log Manager Rapid Implementation, "Implement an Effective Enterprise Log Management Solution That Delivers Rapid Results," 2009 (2 pages).

\* cited by examiner

MANAGING COMPUTING RESOURCE USAGE FOR STANDARDS COMPLIANCE

BACKGROUND

Myriad standards exist for configuring, maintaining, and auditing computer infrastructures and the data that is stored by the infrastructures. The standards are often many-faceted and may be industry-specific. For example, entities in healthcare, financial, federal government, and other industry sectors making use of computer infrastructures may be subject to certain standards. Some standards may be regulatory in nature, such as Securities and Exchange Commission (SEC) regulations for publicly traded companies. Standards may overlap and require similar policy, configuration, and management enforcement and auditing measures. Other standards may have unique requirements that are specific to a particular industry sector.

Entities that are subject to standards may wish to use various computing infrastructure services. Some services, for example, provide a wide range of resources to an entity without requiring the entity to maintain a computer infrastructure. As one example, a provider may supply dynamically scalable and virtualized resources as services over the Internet. The provider typically supplies computers on which the entities can run their applications and store their data. For example, the entities may upload applications, libraries, data, network resources, directory resources, and associated configuration settings to the provider's storage repository and request a number of virtual machines (i.e., server instances), on which they can load their applications. The entities also may increase or decrease, as needed, how much central processing unit (CPU) and storage capacity is needed to run the applications.

An entity using these services, although not maintaining a computing infrastructure, must nevertheless comply with standards that pertain to the configuration, maintenance, and auditing of its data. Consequently, the entity may need to expend a substantial amount of time and resources to configure and maintain its data, resources, and activity logs in manner that is compliant with applicable standards. Furthermore, using these services may complicate these tasks, because providers do not provide functionality that allows entities to configure resources to comply with such standards. Accordingly, the time and expense necessary to configure computing resources for standards compliance may present a significant barrier to entry for entities that may otherwise use computer infrastructure services. Therefore, there is a need for improved systems and methods that facilitate standards compliance for entities that use computer infrastructure services.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
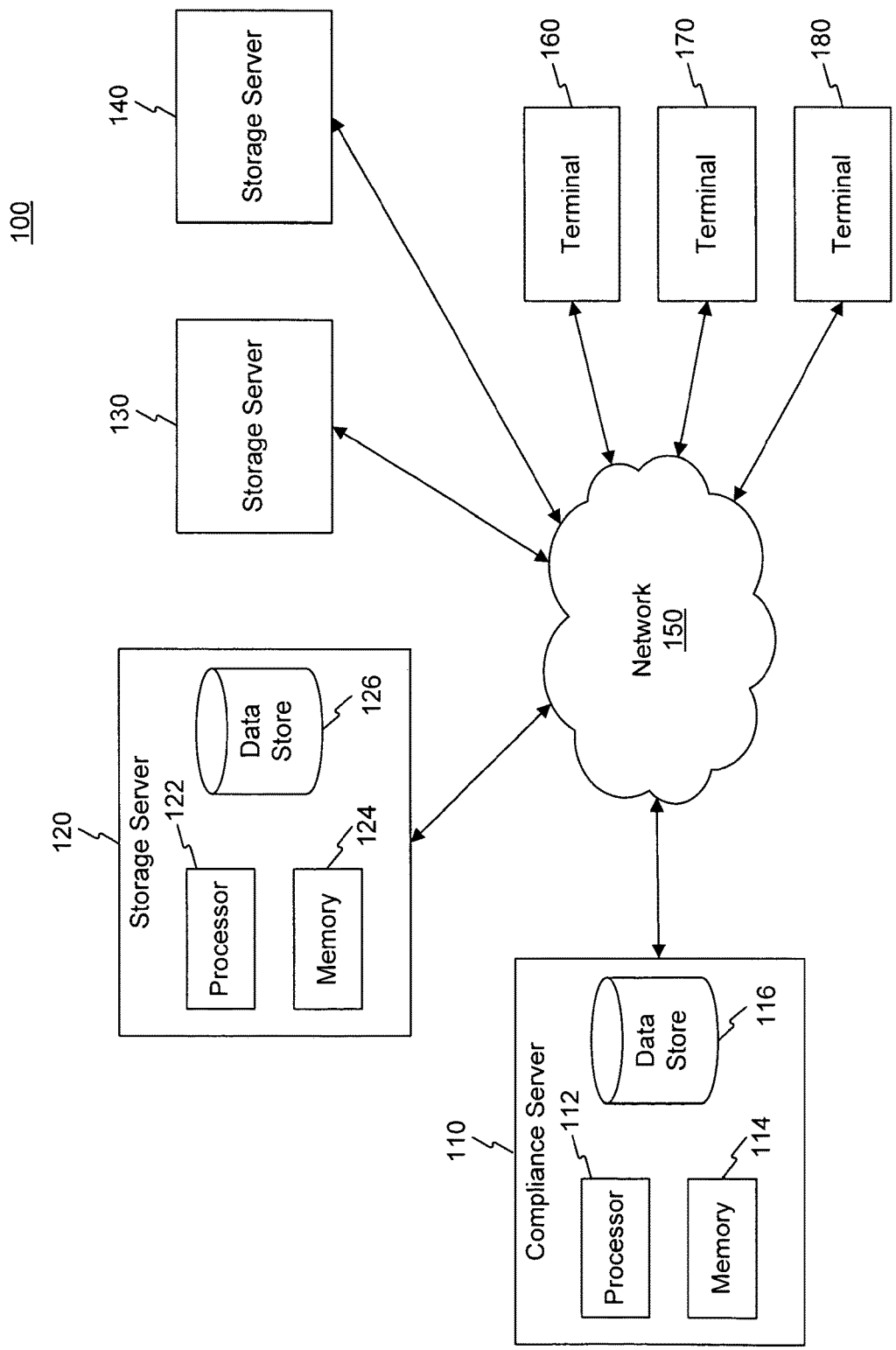
FIG. 1 is a diagram of an example of a system for enabling entities to configure computing resources for compliance with standards.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding blocks to the disclosed methods. Accordingly, the following detailed description is not limiting of the disclosed embodiments. Instead, the proper scope is defined by the appended claims.

Disclosed embodiments provide systems and methods that enable entities to configure computing resources to comply with standards. As the term is used herein, a "standard" may refer to any norm or requirement, and may include regulations, laws, and policies promulgated by the Federal government, a state, a locality, a government agency, other entity (e.g., a standards body), or requirement of an entity that is enforced upon itself (e.g., an entity may wish to enforce its own internal standards, such as corporate retention policies). For example, a standard may specify who can access data, specify network and systems configurations, mandate auditing requirements for the data, and mandate reporting of audit logs to certain authorities. Furthermore, a standard may mandate compliance and/or may be advisory in nature (i.e., recommended standards).

Disclosed embodiments provide systems and methods that enable entities to provide verification of compliance with standards to third parties, such as auditors and/or authorities. For example, disclosed embodiments may enable entities to achieve a desired certification and configuration, and then enable the entities to maintain that certification through appropriate logging, auditing, and enforcement mechanisms. Entities may efficiently select settings for their computing resources in order to regulate who has access to data, automate auditing of data, and provide reporting of audit logs to certain authorities. For example, the entities may further configure their resources to ensure that network, operating system, firewall, intrusion detection or prevention systems, virtual private network (VPN), email retention, data retention, and routing configurations are compliant with applicable standards.

Disclosed embodiments may enable entities that are involved in a variety of industry sectors to comply with applicable standards and provide certification of that compliance. The following provides an overview of industry sectors (e.g., healthcare, financial, federal government sectors, etc.) and standards with which these entities may need to comply. Although certain examples are discussed below, one of ordinary skill in the art will recognize that the disclosed embodiments provide a framework in which entities that are involved in a wide-range of industry sectors may maintain and certify compliance with a wide-range of standards.

Entities involved in the healthcare sector may be subject to the Health Insurance Portability and Accountability Act (HIPAA), which specifies standards for electronic health care transactions. Other entities, such as financial entities, may be subject to the Payment Card Industry Data Security Standard (PCI: DSS), which applies to entities which hold, process, or pass cardholder information from credit cards. Financial entities also may be subject to the Gramm-Leach-Bliley Act (GLBA), which regulates the sharing of personal information regarding individuals who obtain financial products or services. Entities also may be subject to the Sarbanes-Oxley Act (SOX) of 2002, which specifies standards for financial reporting and auditing for U.S. public company boards, management and public accounting firms, or the U.S. Securities and Exchange Commission (SEC), which enforces federal securities laws and regulates the securities industry.

Entities within the Federal government may need to comply with standards, such as the Federal Information Security Management Act (FISMA) of 2002, which requires federal agencies to develop, document, and implement programs to secure information and information systems that support the operations and assets of the agencies. FISMA further may apply to information and systems that are provided or managed by another agency, contractor, or other entity on behalf of the agencies.

Consistent with a disclosed embodiment, a computer-implemented method is provided for configuring and monitoring computing resources of an entity for compliance with one or more standards. A server may receive one or more identifiers of one or more standards and determining a plurality of configuration settings for the computing resources of the entity. The determination may be based on the received one or more identifiers and the plurality of configuration settings may comply with the one or more standards. The method may configure the computing resources of the entity according to the plurality of configuration settings. The server may detect an event related to the computing resources of the entity. The method may include evaluating the detected event and the plurality of configuration settings of the entity for compliance with the one or more standards and determining whether the entity is compliant with the one or more standards, based on the evaluation. The method may further include taking an action, based on the determination.

Consistent with another disclosed embodiment, a computer-implemented method is provided for configuring computing resources of an entity for compliance with one or more standards. A service may receive one or more identifiers of one or more standards. The method may determine a plurality of configuration settings for the computing resources of the entity, based on the received one or more identifiers. The plurality of configuration settings may comply with the one or more standards. The method may further configure the computing resources of the entity according to the plurality of configuration settings.

Consistent with another disclosed embodiment, a computer-implemented method is provided for monitoring computing resources of an entity for compliance with one or more standards. A server may detect an event related to the computing resources of the entity. The method may evaluate the detected event and a plurality of configuration settings of the entity for compliance with the one or more standards. The method may include determining whether the entity is compliant with the one or more standards, based on the evaluation, and the method may include taking an action, based on the determination.

Consistent with yet another disclosed embodiment, a system is provided for configuring computing resources of an entity for compliance with one or more standards. The system may include a processor for executing program instructions and a memory storing the program instructions. The program instructions, when executed by the processor, performs a process. The process includes receiving one or more identifiers of one or more standards and determining a plurality of configuration settings for the computing resources of the entity, based On the received one or more identifiers. The plurality of configuration settings complies with the one or more standards. The process further includes configuring the computing resources of the entity according to the plurality of configuration settings.

Consistent with yet another disclosed embodiment, a system is provided for monitoring computing resources of an entity for compliance with one or more standards. The system may include a processor for executing program instructions and a memory storing the program instructions. The program instructions, when executed by the processor, performs a process. The process includes detecting an event related to the computing resources of the entity, evaluating the detected event and a plurality of configuration settings of the entity for compliance with the one or more standards, determining whether the entity is compliant with the one or more standards, based on the evaluation, and taking an action, based on the determination.

Consistent with other disclosed embodiments, computer-readable storage media may store program instructions, which when executed by a processor, perform any of the methods described herein.

FIG. 1 is an example of a system 100 for enabling entities to configure computing resources to comply with standards, consistent with a disclosed embodiment. System 100 may provide functionality for enabling an entity to select standards, enable or disable configuration settings that are allowed or disallowed by the selected standards, review auditing logs, and receive or transmit reports certifying compliance. For example, such functionality may be provided through a user interface or an application programming interface (API) that calls various compliance services from compliance server 110. As the term is used herein, a "call" to a service may encompass any direct or indirect mechanisms by which compliance server 110 (or other software residing on storage servers 120-140 and/or terminals 160-180) provides information that invokes certain behavior in another software component.

As shown in system 100, compliance server 110, storage servers 120-140, and terminals 160-180 are connected to a network 150. One of skill in the art will appreciate that although one compliance server, three storage servers, and three terminals are depicted in FIG. 1, any number of these components may be provided. Furthermore, one of ordinary skill in the art will recognize that one or more components of system 100 may be combined and/or divided into sub-components. For example, functionality provided by compliance server 110 may be combined with one or more of storage servers 120-140.

Network 150 provides communications between the various components in system 100, such as compliance server 110, storage servers 120-140, and terminals 160-180. In addition, compliance server 110, storage servers 120-140, and/or terminals 160-180 may access legacy systems (not shown) via network 150, or may directly access legacy systems, data stores, or other network applications. Network 150 may be a shared, public, or private network, may encompass a wide area or local area, and may be implemented through any suitable combination of wired and/or wireless communication networks. Network 150 may further comprise an intranet or the Internet.

Compliance server 110 may comprise a general purpose computer (e.g., a personal computer, network computer, server, or mainframe computer) having one or more processors that may be selectively activated or reconfigured by a computer program stored in memory. Compliance server 110 may be implemented in a distributed network, such that compliance server 110 may communicate via network 150 with additional compliance servers (not shown). Alternatively, compliance server 110 may be specially constructed for carrying-out methods consistent with disclosed embodiments.

Compliance server 110 may include a processor 112, a memory 114, and a data store 116. Memory 114 may comprise one or more memory or storage devices that store data as well as software. Memory 114 may also comprise, for example, one or more of RAM, ROM, magnetic storage, or optical storage. Memory 114 may store program modules that, when executed by processor 112, perform one or more processes for enabling access to data residing on data store 116.

Data store 116 may store data reflecting configurations settings and compliance reporting requirements for one or more entities using computing services provided by compliance server 110 and/or storage servers 120-140. For an entity, data store 116 may store data specifying standards that the entity has selected, along with data specifying configuration settings that are allowed or disallowed by the selected standards. For example, standards may regulate who has access to certain data, mandate auditing requirements for the data, and specify requirements for reporting audit logs to certain authorities. Standards may further specify network, operating system, firewall, virtual private network (VPN), intrusion detection or prevention systems, email retention, data retention, and routing configurations. The standards may specify time periods, operational requirements, security procedures, etc. that relate to these settings. For example, standards may specify encryption requirements for data at rest (e.g., on live volumes or backup media) and data that is being transmitted.

Storage servers 120-140 may each comprise a general purpose computer (e.g., a personal computer, network computer, server, or mainframe computer) having one or more processors that may be selectively activated or reconfigured by a computer program. Storage servers 120-140 may be implemented in a distributed network. For example, storage servers 120-140 may communicate via network 150 with additional storage servers (not shown), which may enable storage servers 120-140 to distribute processes for parallel execution by a plurality of storage servers. Collectively, storage servers 120-140 (and any additional storage servers) may comprise a storage area network (SAN). Alternatively, storage servers 120-140 may be specially constructed for carrying out methods consistent with disclosed embodiments.

Storage server 120 may include a processor 122, a memory 124, and a data store 126. Memory 124 may comprise one or more memory or storage devices that store data as well as software. Memory 124 may also comprise, for example, one or more of RAM, ROM, magnetic storage, or optical storage. Memory 124 may store program modules that, when executed by processor 122, perform one or more processes for storing and/or accessing data residing on data store 126. Although not depicted in FIG. 1, storage servers 130 and 140 may include components that are equivalent to that of storage server 120.

Data store 126 may comprise a plurality of storage devices, such as disk storage devices, optical storage devices, etc. For example, data store 126 may comprise multiple disk drives that combine to form a disk array. The disk array may include, for example, a disk array controller, a cache, disk enclosures, and a power supply. The disk array controller may connect to network 150 via a port (not shown), which may serve as an interface between the disk array controller and network 150.

Storage server 120 may host various data for entities, and may provide functionality for authenticating users and providing access to the data. For example, storage server 120 may host applications, libraries, data, and associated configuration settings. Furthermore, storage server 120 may host other data, such as electronic mail messages, Internet sites, or intranet sites.

Storage server 120 may allow users at, for example, terminals 160-180 to access the data being hosted by storage server 120. Furthermore, storage server 120 may allow entities storing data that is hosted by storage server 120 to access, modify, and load data onto storage server 120. For example, entities may access data hosted by storage server 120 over network 150 through an Internet browser or software application running on any one of terminals 160-180. Alternatively, entities may access data hosted by storage server 120 over network 150 through an application program interface (API).

In one embodiment, storage server 120 may transmit a document (e.g., a JavaScript Object Notation (JSON) document, an Extensible Markup Language (XML) document, or a web page) that is accessible by an Internet browser executing on one of terminals 160-180. The document may include options for a user (e.g., an administrator of an entity) to log onto a secure site provided by storage server 110. For example, a user may log onto a secure site provided by storage server 110 by supplying credentials, such as a username and a password. Because the Internet site may use a secure communication environment, such as an HTTPS (hypertext transfer protocol secure) environment to transfer data over network 150, data transfer is assumed to be secure.

Terminals 160-180 may be any type device for communicating with compliance server 110 and/or storage servers 120-140 over network 150. For example, each of terminals 160-180 may correspond to various entities that use computing services. Administrators of these entities may use terminals 160-180 to access and/or receive data from compliance server 110 and/or storage servers 120-140. Terminals 160-180 may be personal computers, handheld devices (e.g., PDAs, cellular phones, etc.), or any other appropriate computing platform or device capable of exchanging data with network 150. Terminals 160-180 may each include a processor (not shown) and a memory (not shown). Furthermore, terminals 160-180 may execute program modules that provide one or more graphical user interfaces (GUIs) for interacting with network resources, such as compliance server 110 and/or storage servers 120-140. Alternatively, as discussed above, in other embodiments, users of terminals 160-180 may access data through other network mechanisms, such as through an API of a Web service.

In operation, compliance server 110 may permit an administrator of an entity, via one of terminals 160-180, to select or update a standard or a set of standards (e.g., HIPAA, GLBA, SOX, PCI:DSS, etc.) with which the entity must comply or wishes to comply. For example, using a Web service or a GUI, an administrator of an entity at terminal 160 (e.g., a financial services entity) may select or update one or more standards (e.g., PCI: DSS, GLBA, etc.) from a variety of different standards that compliance server 110 supports. The standards that compliance server 110 supports may be constantly evolving such that new standards are being added and existing standards may be updated, as needed.

Following selection of the standards, compliance server 110 may automatically configure the computing services of an entity such that it complies with the selected standards. Furthermore, compliance server 110 may automatically deny configurations and/or changes to existing configurations that would violate the selected standards. As part of the configuration process, for an entity that selects two or more standards, compliance server 110 may resolve any conflicts between the two or more standards. For example, one standard may require data retention time period (e.g., 30 days) that is different from a data retention time period (e.g., 90 days) required by another standard. Accordingly, compliance server 110 may resolve the conflict such that the entity's computing resources are compliant with both standards (e.g., enforcing a data retention period of 90 days).

In other embodiments, once the standard or standards have been selected, compliance server 110 may recommend or identify configuration settings that must be enabled and configuration settings that must not be enabled for an entity to comply with one or more sets of standards (e.g., HIPAA, GLBA, SOX, PCI:DSS, etc.). An administrator acting on behalf of the entity may then select which configuration settings to enable and disable based on the recommendations that were provided by compliance server 110. For example, compliance server 110 may transmit a document to one of terminals 160-180 indicating configuration settings that are allowed/disallowed by the selected standard or set of standards. An administrator or agent acting on behalf of the entity may make selections (e.g., using checkboxes, selecting icons, etc.) to indicate whether or not the entity wishes to accept or ignore the recommendations. Accordingly, an entity may configure its computing resources manually in such an embodiment in lieu of having compliance server 110 automatically configure its computing resources.

Compliance server 110 may further provide an entity or a third party (e.g., an auditor, authority, etc.) with a certification indicating that the entity has chosen specified compliance constraints. For example, once an entity has selected configuration settings for one or more standards, compliance server 110 may generate a certification of compliance. Compliance server 110 may transmit the certification to the entity or to a third party via network 150. For example, compliance server 110 may generate subsequent certifications at period intervals or at a predetermined later date in order to certify that compliance is ongoing (or to inform a third party that an entity is no longer compliance). Furthermore, compliance server 110 may maintain an audit log for changes that are made to the selected configuration settings. Compliance server 110 may further record data to an audit log reflecting other events or changes that relate to an entity's computing resources, such as records reflecting accounts used to access, store, alter, or transmit data.

Compliance server 110 may automatically run queries against an entity's access logs, data, instance logs, and any other data stored on storage servers 120-140. For example, compliance server 110 may automatically transmit reports to an entity at one of terminals 160-180. For example, compliance server 110 may generate such reports at a frequency that is specified by the standards that were chosen and/or based on user selections. Furthermore, compliance server 110 may provide an interface that permits an administrator or other authorized person to review the reports. Compliance server 110 may transmit or otherwise make available reports to other third parties, such as auditors and/or authorities: For example, a third party auditing firm may examine configuration, access and/or audit logs, and service choices to certify compliance with one or more selected standards. Review of access logs, audit logs, and/or reports (e.g., by a representative of an entity or other third party) may need to occur on a regular basis in order for an entity to maintain compliance.

In one embodiment, compliance server 110 may provide verification that data has not been altered or tampered with. One area in which compliance server 110 may provide such a verification relates to machine images. In computing, a "machine image" refers to a package of software that can be used to instantiate a virtual machine in system 100. A machine image may include an operating system and additional software that provides a service. For example, an entity may deploy a machine image on one of storage servers 120-140. In order to verify the machine image, compliance server 110 may label the machine image with an identifier. The entity may, at a subsequent point in time, add software to the machine image, and then re-bundle the machine image for deployment. Compliance server 110 may confirm that every instance of the machine image running in the entity's network is derived from a certified, approved machine image, through the use of the identifier.

In one embodiment, compliance server 110 may provide compliance services to an entity that maintains its own computer infrastructure and stores its own data. In other embodiments, compliance server 110 may provide compliance services to any entity that uses a computer infrastructure services provider to host its data. Accordingly, in some embodiments, compliance server 110 and one or more of storage servers 120-140 may be under the control of a single entity (e.g., a computer infrastructure services provider) and, in other embodiments, compliance server 110 may be under the control an entity (e.g., a compliance services provider) and one or more of storage servers 120-140 may be under the control of another entity (e.g., an entity storing its own data and using services provided by compliance server 110).

Figure 2:
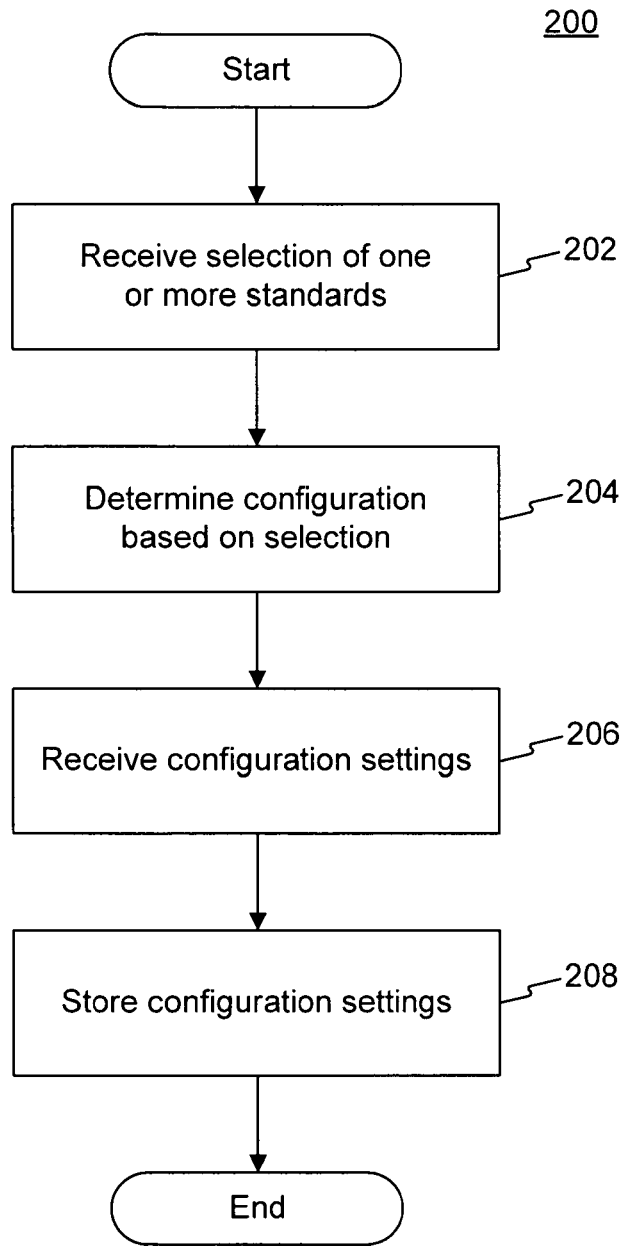
FIG. 2 is a flow diagram of an example of a routine for configuring computing resources of an entity for compliance.

FIG. 2 is a flow diagram of an example of a routine 200 for configuring computing resources of an entity for compliance, consistent with a disclosed embodiment. Routine 200 provides an overview of a process in which compliance server 110 enables an entity to select one or more standards and determines configuration settings that are and are not available according to the one or more standards.

Prior to the start of routine 200, a user may be authenticated by, for example, compliance server 110. For example, prior to the start of routine 200, compliance server 110 may transmit a document (e.g., a web page) that is accessible by an Internet browser executing on, for example, terminal 160. The document may include options for a user to log onto a secure site provided by compliance server 110. The user may log onto the secure site by supplying credentials, such as a username and a password. Once authenticated, routine 200 may begin.

In block 202, compliance server 110 (e.g., a service provided by compliance server 110) may receive a selection of one or more standards. For example, continuing with the above example, a user (e.g., an administrator of an entity) at terminal 160, following being authenticated, may have selected one or more standards using a GUI. The selection may include, for example, identifiers that correspond to the selected standards. Furthermore, in other embodiments, receiving the selection of one or more standards may comprise receiving one or more standards that are uploaded by the user at terminal 160. The uploaded standards may include identifiers and may specify requirements related to the standards (e.g., the user may upload a data retention standard). In yet other embodiments, the user at terminal 160 and/or an administrator of compliance server 110 may change one or more standards (e.g., revise or update the standards).

In block 204, compliance server 110 may determine configuration settings for the entity's computing resources such that the entity is compliant with the selected standards. For example, compliance server 110 may determine configuration settings that regulate who has access to certain data, mandate auditing requirements for the data, and/or specify requirements for reporting audit logs to certain authorities. Standards may further specify network, operating system, firewall, virtual private network (VPN), intrusion detection or prevention systems, email retention, data retention, and/or routing configurations. Furthermore, the configuration settings may enforce time periods, operational requirements, security procedures, etc., that relate to these settings. Still further, during the configuration of an entity's resources, compliance server 110 may schedule certain reminders to be sent to an administrator of the entity that remind the administrator of any actions that the selected standards require, such as reviewing certain reports (e.g., a log) at periodic intervals.

In one embodiment, following the determination made in block 204, compliance server 110 may proceed to block 208 and automatically configure the entity's computing resources, based on the determination. In other embodiments, routine 200 may instead proceed to block 207. In block 206, compliance server 110 may recommend or identify configuration settings that must be enabled and/or that must not be enabled for an entity to comply with the selected standards. For example, following the determination made in block 204, compliance server 110 may transmit a document to terminal 160 indicating configuration settings that are allowed/disallowed by the selected standard or set of standards.

In block 206, compliance server 110 may receive selection of configuration settings from a user, such as an administrator at terminal 160. The administrator, acting on behalf of the entity, may select which configuration settings to enable and which to disable based on the recommendations that were provided by compliance server 110. For example, the administrator may make selections (e.g., using checkboxes, selecting icons, using pull-down menus, etc.) to indicate whether or not the entity wishes to accept or ignore the recommendations provided by compliance server 110.

In block 208, compliance server 110 may update the configuration settings for the entity. For example, compliance server 110 may store data reflecting the configuration settings for the entity in data store 116.

Figure 3:
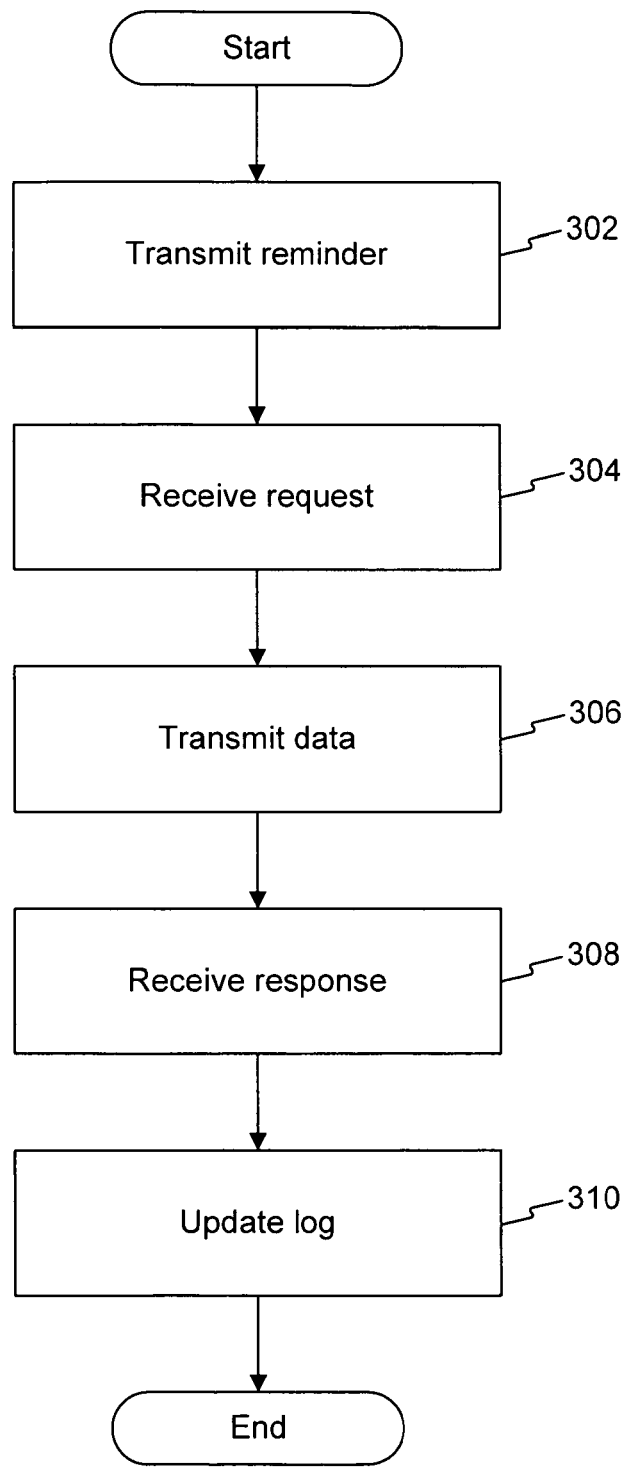
FIG. 3 is a flow diagram of an example of a routine for reviewing and updating auditing information.

FIG. 3 is a flow diagram of an example of a routine 300 for reviewing and certifying compliance, consistent with a disclosed embodiment. For example, routine 300 may prompt or remind an administrator to take a particular action that is related to one or more selected standards. As discussed above in connection with FIG. 2, as part of the configuration process, compliance server 110 may have scheduled certain reminders, as needed, based on the selected standards. Accordingly, routine 300 provides an overview of a process in which compliance server 110 provides a reminder and receives evidence of compliance with certain tasks that are specified by selected standards.

In block 302, compliance server 110 may transmit a reminder (e.g., an email message) to one of terminals 160-180. The reminder may relate to a task, which a standard may mandate that an entity perform at a certain time. For example, an entity may be required to review certain audit logs on a regular basis and certify that the entity has reviewed the logs.

In block 304, compliance server 110 may receive a request from one of terminals 160-180. For example, an administrator of an entity at one of terminals 160-180 may, in response to the reminder, request certain data (e.g., audit logs) for review. Prior to transmitting the request, the user may have been authenticated by compliance server 110 (e.g., the administrator may have supplied credentials, such as a username and a password, as discussed above).

In block 306, compliance server 110 may transmit the requested data to one of terminals 160-180 for review. For example, compliance server 110 may transmit certain audit logs (e.g., access logs) or other data for the entity's review.

In block 308, compliance server 110 may receive a response from one of terminals 160-180. For example, using one of terminals 160-180, the administrator may complete a document indicating that the data was reviewed (e.g., a certification by the administrator).

In block 310, compliance server 110 may update an audit log or other record to indicate that the entity has completed the task, based on the received response. Compliance server 110 may store the updated audit log or record in data store 116. Compliance server 110 may further transmit the updated audit or record to the entity and/or a third party authorized the entity at a scheduled time or per the entity's request. Alternatively, the entity has transmit a certification certifying that the entity has complied with the requirement.

Figure 4:
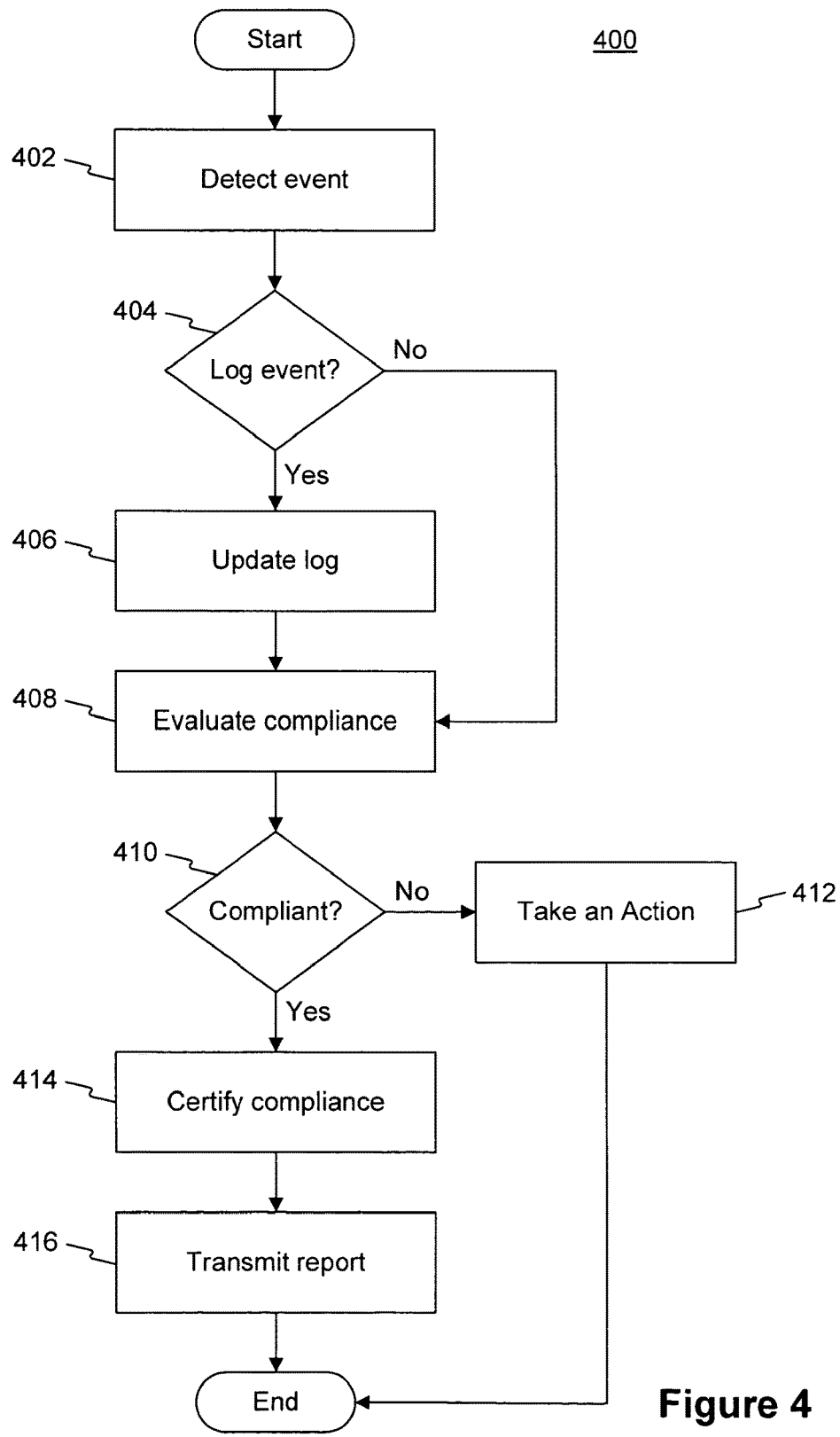
FIG. 4 is a flow diagram of an example of a routine for monitoring and certifying compliance.

FIG. 4 is a flow diagram of an example of a routine 400 for monitoring and certifying compliance, consistent with a disclosed embodiment. Routine 400 provides an overview of a process in which compliance server 110 monitors computing resources of an entity for compliance with selected standards.

In block 402, compliance server 110 may detect an event that is related to the computing resources of an entity. For example, compliance server 110 may monitor resources and configuration settings of an entity for changes and/or new events through a monitoring service. For example, the event may constitute an access request, an intrusion detection, a transfer of data, a change to a configuration setting, etc.

In block 404, compliance server 110 may determine whether the event requires logging, according to the configuration settings of the entity. For example, compliance server 110 may determine whether one or more selected standards require the entity to log the event. If compliance server 110 determines that the event should be logged, then routine 400 may proceed to block 406. If compliance server 110 determines that the event does not require logging, then routine 400 may proceed to block 408.

In block 406, compliance server 110 may update a log. For example, compliance server 110 may maintain an event log in data store 116. The log may. include data reflecting the event (e.g., a classification of the type of event, a date and time of the event, a username, etc.).

In block 408, compliance server 110 may evaluate compliance of the entity. The evaluation may include consideration of data of the entity that is stored in one or more of storage servers 120-140, the configuration settings of the entity, and/or an event that was detected in block 402. For example, compliance server 110 may execute one or more queries according to the selected standards to evaluate whether the entity's data, configuration settings, or the detected event are consistent or inconsistent with the selected standards.

In block 410, compliance server 110 may determine whether the entity is compliant. If the entity is not compliant or the detected event would result in a configuration that is not compliant, routine 400 may proceed to block 412. In block 412, compliance server 110 may take an action. The action may bring the entity into compliance with the selected standards and/or may prohibit the entity from becoming non-compliant with the one or more standards (e.g., preventing the entity from using a non-compliant configuration setting or changing a configuration setting such that the changed setting would be non-compliant). In other embodiments, the action may comprise recording the detected event. Compliance server 110 may certify the recording of the detected event with a digital signature.

In yet other embodiments, the action may include transmitting a notification of compliance status (e.g., a notification of compliance or non-compliance). For example, the notification may indicate that remedying the non-compliance is within the entity's discretion or remedying the non-compliance is mandatory. Compliance server 110 may transmit the notification to an administrator and/or a third party. For example, a notification that is sent to an administrator may identify an event or configuration change that resulted in non-compliance so that the administrator may bring the entity back into compliance. Alternatively, in other embodiments, compliance server 110 may transmit a report (e.g., an audit log) providing additional data regarding the entity's compliance and/or non-compliance with certain standards. If the entity is compliant, routine 400 may proceed to block 414.

In block 414, compliance server 110 may take an action to certify compliance of the entity. For example, compliance server 110 may generate a report reflecting that the entity is fully compliant with one or more standards. Furthermore, compliance server 110 may generate separate reports on a per standard basis. The reports may constitute and/or include audit logs. Still further, the action may comprise recording the detected event and certifying that detected event was compliant. Compliance server, 110 may certify the recording of the detected event or the report reflecting compliance with a digital signature. Furthermore, in addition to being able to determine the compliance state of an entity at intervals, compliance server 110 may continuously monitor the entity. For example, in some embodiments, compliance server 110 may continuously monitor configuration settings, detect events, and/or store records relating to configuration changes and/or the detected events. Through such monitoring and detection by compliance server 110, compliance server 110 may continuously certify that an entity has remained compliant with one or more standards over a time interval.

In block 416, compliance server 110 may transmit the report. The report may be in the form of a PDF document or compliance server 110 may transmit a URL identifying a location from which the report may be retrieved. As part of block 416, the report may be transmitted to the entity and/or other third parties (e.g., auditor, government agency). For example, the entity, as part of its configuration settings, may specify a third party auditing firm that is an authorized recipient of reports and/or audit log results (e.g., an accounting firm receives the data).

As one of ordinary skill in the art will appreciate, one or more of blocks 202-208, 302-310, and 402-416 may be optional and may be omitted from implementations in certain embodiments. Furthermore, functionality provided by one or more of blocks 202-208, 302-310, and 402-416 may be subdivided into multiple blocks or combined.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Furthermore, the blocks of the disclosed routines may be modified in any manner, including by reordering blocks and/or inserting or deleting blocks. It is intended, therefore, that the specification and examples be considered as illustrative only, with a true scope and spirit being indicated by the following claims and their full scope of equivalents.

What is claimed is:

1. A computer-implemented method, comprising:
   receiving, by a server computer of a computer infrastructure services provider that provides a plurality of computers for use by users, a request from a first user that relates to use of multiple virtual machines and that identifies one or more governmental standards having at least one of a regulation or law or policy promulgated by a governmental agency or other governmental entity;
   determining, by the server computer, configuration settings that comply with the one or more governmental standards;
   providing, by the server computer, and for use by the first user, the multiple virtual machines using one or more computers selected from the plurality, including configuring the provided multiple virtual machines according to the configuration settings;

monitoring, by the server computer and during the use by the first user, the configured provided multiple virtual machines for ongoing compliance with the configuration settings; and
providing, by the server computer, a notification based on the monitoring.

2. The computer-implemented method of claim 1 wherein the providing of the multiple virtual machines includes executing one or more programs for the first user on the provided multiple virtual machines after the configuring.

3. The computer-implemented method of claim 1 wherein at least one of the configuration settings specifies who has access to data that is retrieved and used by one or more of the multiple virtual machines during ongoing operations of the one or more virtual machines, and wherein the providing of the multiple virtual machines includes enforcing the access to the data during the ongoing operations of the one or more virtual machines based on the at least one configuration setting.

4. The computer-implemented method of claim 1 wherein at least one of the configuration settings automates auditing of data, and wherein the providing of the multiple virtual machines includes performing the auditing of the data based on the at least one configuration setting.

5. The computer-implemented method of claim 1 wherein at least one of the configuration settings specify a configuration of a firewall, and wherein the providing of the multiple virtual machines includes providing the firewall based on the at least one configuration setting.

6. The computer-implemented method of claim 1 wherein at least one of the configuration settings specify a configuration of an intrusion detection or prevention service, and wherein the providing of the multiple virtual machines includes providing functionality of the intrusion detection or prevention service for the multiple virtual machines based on the at least one configuration setting.

7. The computer-implemented method of claim 1 wherein at least one of the configuration settings specify data retention requirements, and wherein the providing of the multiple virtual machines includes monitoring the data retention requirements for the multiple virtual machines based on the at least one configuration setting.

8. The computer-implemented method of claim 1 wherein the request from the first user indicates a quantity of the multiple virtual machines, and wherein the providing of the multiple virtual machines includes selecting, by the server computer, the one or more computers based at least in part on the one or more computers hosting at least the indicated quantity of virtual machines, and providing the indicated quantity of virtual machines from the selected one or more computers for use by the first user.

9. The computer-implemented method of claim 1 wherein the providing of the multiple virtual machines for use by the first user further includes providing additional computing resources for use by the first user that are hosted by the computer infrastructure services provider, and modifying, during use of the multiple virtual machines by the first user, one or more of the configuration settings for further use by the first user.

10. A system comprising:
a processor for executing program instructions; and
a memory storing the program instructions, the program instructions, when executed by the processor, providing functionality of a computer infrastructure services provider that manages a plurality of computers for use by users, the providing of the functionality including at least:

receiving a request from a first user for use of one or more virtual machines and that identifies one or more regulatory requirements for one or more standards including at least one of a regulation or law or policy promulgated by a governmental agency or other governmental entity;
determining configuration settings that comply with the one or more regulatory requirements;
providing, for use by the first user, the one or more virtual machines using one or more computers selected from the plurality, including configuring the provided virtual machines according to the configuration settings;
monitoring the configured provided virtual machines for ongoing compliance with the configuration settings; and
providing information based on the monitoring.

11. The system of claim 10 wherein the providing of the virtual machines includes executing one or more programs for the first user on the provided virtual machines after the configuring.

12. The system of claim 10 wherein at least one of the configuration settings specifies who has access to data that is retrieved and used during ongoing operations of the one or more virtual machines, and wherein the providing of the one or more virtual machines includes enforcing the access to the data during the ongoing operations of the one or more virtual machines based on the at least one configuration setting.

13. The system of claim 10 wherein at least one of the configuration settings automates auditing of data, and wherein the providing of the virtual machines includes performing the auditing of the data based on the at least one configuration setting.

14. The system of claim 10 wherein at least one of the configuration settings specify a configuration of a firewall, and wherein the providing of the virtual machines includes providing the firewall based on the at least one configuration setting.

15. The system of claim 10 wherein at least one of the configuration settings specify a configuration of an intrusion detection service, and wherein the providing of the virtual machines includes providing functionality of the intrusion detection service for the provided virtual machines based on the at least one configuration setting.

16. The system of claim 10 wherein at least one of the configuration settings specify data retention requirements, and wherein the providing of the virtual machines includes monitoring the data retention requirements for the provided virtual machines based on the at least one configuration setting.

17. The system of claim 10 wherein the request from the first user indicates a quantity of multiple virtual machines and identifies one or more governmental standards to which the one or more regulatory requirements correspond, and wherein the providing of the virtual machines includes selecting, by the computer infrastructure services provider, the one or more computers based at least in part on the one or more computers hosting at least the indicated quantity of multiple virtual machines, and providing the indicated quantity of multiple virtual machines from the selected one or more computers for use by the first user.

18. The system of claim 10 wherein the providing of the virtual machines for use by the first user further includes providing additional computing resources for use by the first user that are hosted by the computer infrastructure services provider, and modifying, during use of the virtual machines by the first user, one or more of the configuration settings to affect further use by the first user of the provided virtual machines and additional computing resources.

\* \* \* \* \*